US009645888B1

(12) United States Patent
Panchanathan et al.

(10) Patent No.: US 9,645,888 B1
(45) Date of Patent: May 9, 2017

(54) CACHING OF BACKUP CHUNKS

(71) Applicant: EMC IP Holding Company LLC, Hopkinton, MA (US)

(72) Inventors: Balaji Panchanathan, Bangalore (IN); Arun Sambamoorthy, Bangalore (IN); Satchidananda Patra, Bangalore (IN); Pravin Kumar Ashok Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 322 days.

(21) Appl. No.: 14/293,977

(22) Filed: Jun. 2, 2014

(51) Int. Cl.
*G06F 17/30* (2006.01)
*G06F 11/14* (2006.01)

(52) U.S. Cl.
CPC .................. *G06F 11/1451* (2013.01)

(58) Field of Classification Search
CPC .......... G06F 11/1448; G06F 11/1451
See application file for complete search history.

(56) References Cited

U.S. PATENT DOCUMENTS

| | | | | |
|---|---|---|---|---|
| 6,904,449 B1* | 6/2005 | Quinones | ............ | G06Q 10/10 709/203 |
| 8,135,676 B1* | 3/2012 | Poojary | ............ | G06F 11/1451 707/646 |
| 8,504,529 B1* | 8/2013 | Zheng | ............ | G06F 11/1469 707/679 |
| 8,584,145 B1* | 11/2013 | Havemose | ........ | G06F 11/1482 707/610 |
| 8,943,282 B1* | 1/2015 | Armangau | ........ | G06F 17/30088 711/126 |
| 9,189,341 B1* | 11/2015 | Natanzon | ............ | G06F 11/1451 |
| 2001/0034812 A1* | 10/2001 | Ignatius | ............ | G06F 3/0605 711/112 |
| 2004/0250033 A1* | 12/2004 | Prahlad | ............ | G06F 11/1451 711/162 |
| 2005/0182888 A1* | 8/2005 | Murotani | ............ | G06F 11/1456 711/1 |
| 2007/0185936 A1* | 8/2007 | Derk | ............ | G06F 11/1451 |
| 2009/0113167 A1* | 4/2009 | Camble | ............ | G06F 11/1451 711/216 |
| 2012/0005165 A1* | 1/2012 | Tsai | ............ | G06F 11/1456 707/652 |
| 2014/0052692 A1* | 2/2014 | Zhang | ............ | G06F 17/30088 707/639 |
| 2014/0250079 A1* | 9/2014 | Gardner | ............ | G06F 11/1453 707/646 |
| 2014/0258236 A1* | 9/2014 | Vijayan | ............ | G06F 11/1448 707/639 |
| 2015/0186519 A1* | 7/2015 | Popov | ............ | G06F 17/30622 707/723 |

* cited by examiner

*Primary Examiner* — Noosha Arjomandi
(74) *Attorney, Agent, or Firm* — Van Pelt, Yi & James LLP

(57) ABSTRACT

Contents of a plurality of backups that share a common characteristic are profiled. A portion of the plurality of backups is selected as a base backup reference data to be distributed. A first copy of the base backup reference data is stored at a storage of a backup server. A second copy of the base backup reference data is provided for storage at a storage of a client that shares the common characteristic. The client is located remotely from the backup server.

19 Claims, 4 Drawing Sheets

CACHING OF BACKUP CHUNKS

BACKGROUND OF THE INVENTION

Often data backups are stored remotely from a storage being backed up. For example, a central remote network server performs and manages backup of clients to a remote networked storage. However, when data is backed up to a remote storage, the data to be backed is sent via a network that is often bandwidth constrained. Additionally, when data is restored from a remote storage, the data to be used to restore data is also sent via the bandwidth constrained network. This may lead to long backup and restore times. Therefore, there exists a need for a way to more efficiently perform and restore from a backup.

BRIEF DESCRIPTION OF THE DRAWINGS

Various embodiments of the invention are disclosed in the following detailed description and the accompanying drawings.

DETAILED DESCRIPTION

Figure 1:
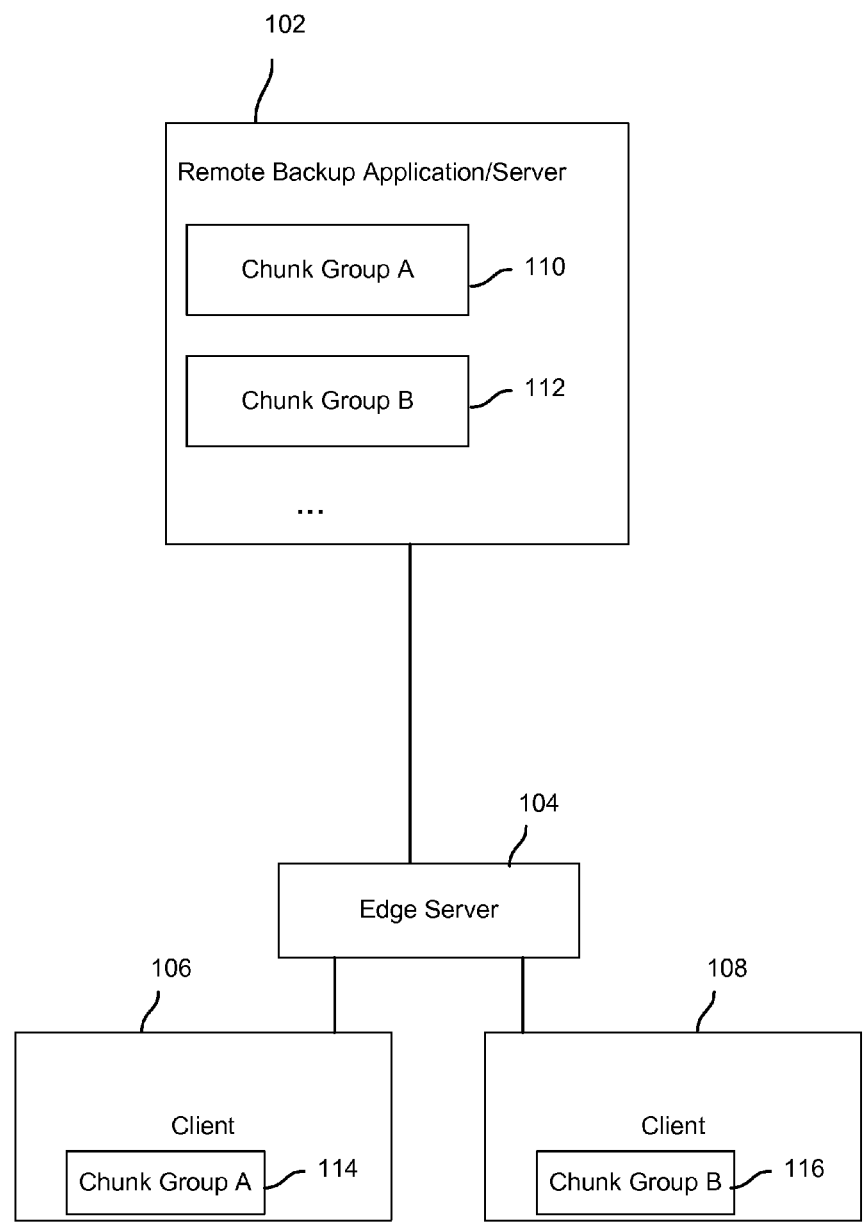
FIG. 1 is a block diagram illustrating a backup environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Improving performance of a backup system is disclosed. In some embodiments, contents of a plurality of backups that share a common characteristic are profiled. For example, backup data from a plurality of clients that share the same operating system are divided into chunks and analyzed to determine a commonality within the plurality of backup data. A portion of the plurality of backups is selected as a base backup reference data to be distributed. For example, chunks that have been identified as frequently included in the plurality of backups are selected to be included in a set of chunks to be utilized as a backup reference set. If data to be backed up or restored includes data portions (e.g., chunks) that are also included in the backup reference set, an identifier of the data portion(s) may be communicated over a network rather than the actual contents of the data portion (s) because both parties are storing the backup reference set. A first copy of the base backup reference data is stored in a storage of a backup server. For example, the base backup reference is stored in a storage in close network proximity to the backup server facilitating backup and restore of a backup source. A second copy of the base backup reference is stored at a storage of a backup source that shares the common characteristic. The backup source is located remotely for the backup server. For example, a client that is utilizing the same operating system as the backup sources of the plurality of backups stores the base backup reference data for use during backups and restores.

FIG. 1 is a block diagram illustrating a backup environment. Remote backup application/server 102 is connected to client 106 and client 108 via edge server 104. For example, remote backup application/server 102 includes a server and/or application that manages a backup of one or more backup sources, including client 106 and client 108. In some embodiments, remote backup application/server 102 manages data protection, recovery, and/or backup across one or more clients, sites, virtual environments, IT environments, and/or data storage locations/devices. An example of remote backup application/server 102 includes EMC NetWorker™ and/or Avamar® of EMC Corporation. In some embodiments, EMC NetWorker and Avamar are a suite of enterprise level data protection software that unifies and automates backup to tape, disk-based, and/or flash-based storage media across physical and virtual environments for granular and disaster recovery. Cross-platform support is provided for many operating system environments and file systems. EMC NetWorker/Avamar may manage data zones that contain clients/data to be backed up. The NetWorker/Avamar management console may provide a graphic user interface for functions such as client configuration, policy settings, schedules, monitoring, reports, and daily operations for de-duplicated and non-de-duplicated backups. Examples of client 106 and 108 include a server, a user device, a virtual machine, and another system, computer or storage that can be backed up. In some embodiments, edge server 104 facilitates a network communication between a client and a remote backup server/application. In some embodiments, edge server 104 hosts one or more clients. For example, edge server 104 includes a hypervisor hosting one or more virtual machines. Edge server 104 may be optional in some embodiments.

In some embodiments, remote backup application/server 102 is located remotely (e.g., connected via a network) from a backup source to be backed up and/or restored. For example, when data is to be backed from client 106, backup application 102 remotely initiates a backup process to store the backup data to: storage included in backup server 102, a storage physically connected to server 102, and/or a remote data storage accessible via network connection (e.g., network storage located close in network proximity to backup server 102). In another example, when data is to be restored to client 106, backup application 102 initiates a backup process using stored backup data from: storage included in backup server 102, storage physically connected to server 102, and/or to a remote data storage accessible via network connection (e.g., network storage located close in network proximity to backup server 102). In various embodiments, the data to be backed up and/or restored data is stored in one or more of the following: a storage included in a client (e.g., included in client 106/108), a storage attached to the client, a storage included in edge server 104, a storage attached to edge server 104, and/or a storage connected to the client via a network connection.

Because backup data is communicated between remote backup application/server 102 and a client (e.g., client 106/108) via a network, constraints of the network (e.g., bandwidth, latency, reliability, etc.) may hinder performance of a backup or backup restoration from a remote backup source. In some embodiments, backup application/server 102 profiles already stored backup content of a particular group to identify portions of the backups that appear frequently. For example, backups that are of backup sources that share a common characteristic (e.g., same operating system, same user, same network topology position, same associated application, same function, same device, etc.) are identified and chunked (e.g., divide backup data into consistently comparable chunks). The chunking may be also performed as a consequence of performing deduplication to locate data chunks that are duplicated in backup data. In some embodiments, by tallying a number of times a particular data portion (e.g., chunk) appears across the backups, popular data portions are identified for inclusion in a base backup reference data. If data to be backed up or restored includes a data portion (e.g., chunk) that is also included in the backup reference set, an identifier of the data portion(s) may be communicated over a network without their actual contents to save bandwidth and processing resources. In order for both communication parties to understand the data portion identifiers, both ends of the communication parties store the base backup reference data.

In the example shown in FIG. 1, using backup data from prior backups, backup application/server 102 has identified a base backup reference data (e.g., chunk group A 110 stored in a local and/or remote storage of backup application/server 102) for one group of backups sharing a common characteristic (e.g., backups of clients all running the Windows operating system) and another base backup reference data (e.g., chunk group B 112 stored in a local and/or remote storage of backup application/server 102) for another group of backups sharing another common characteristic (e.g., backups of clients all running the Linux operating system). These reference data have been also distributed to backup sources (e.g., clients) that share the same respective common characteristic. In FIG. 1, client 106 shares the common characteristic of chunk group A and is storing in its local and/or remote storage chunk group A 114, whereas client 108 shares the common characteristic of chunk group B and is storing in its local and/or remote storage chunk group B 116. When client 106 is to be backed up, the data to be backed up may be analyzed to determine whether the data to be backed up includes chunks/data portions of chunk group A, and any matching portion would not have to be provided to the backup application/server because the backup application/server is already storing the contents of chunk group A and may easily obtain the matching portion using an identifier of the matching portion. In another example, when client 108 is to be restored using a previously stored backup, any portion of the data to be restored matching a content of a chunk group B would not have to be provided by the backup application/server because the client 108 is already storing the contents of chunk group B and may easily obtain the matching portion using an identifier of the matching chunk content. In some embodiments, when a new client (e.g., backup source) is established, the client may be prepopulated with base backup reference data that matches a characteristic of the new client to allow the new client to be efficiently restored and backed up.

Any of the components shown in FIG. 1 may be connected with another component via a network that may include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware devices. One or more of the components shown in FIG. 1 may be included in the same machine. Other communication paths may exist and the example of FIG. 1 has been simplified to illustrate the example clearly. Although a single or a few instances of components have been shown to simplify the diagram, additional instances of any of the components shown in FIG. 1 may exist. For example, multiple edge servers with multiple clients may be connected to backup application 102. Components not shown in FIG. 1 may also exist.

Figure 2:
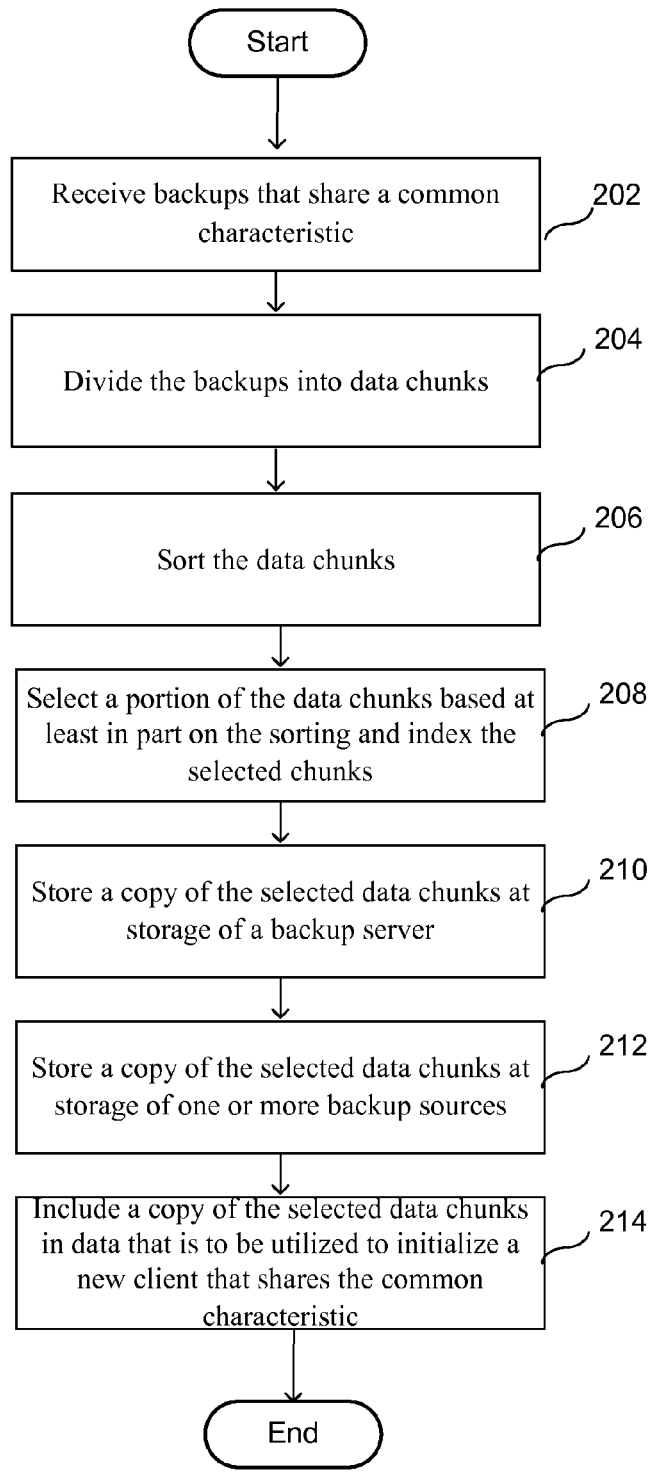
FIG. 2 is a flowchart illustrating an embodiment of a process for profiling portions of backups.

FIG. 2 is a flowchart illustrating an embodiment of a process for profiling portions of backups. The process of FIG. 2 may be implemented on remote backup application/server 102 and/or edge server 104 of FIG. 1.

At 202, backups that share a common characteristic are received. In some embodiments, the backups include one or more backup instances of one or more backup sources. For example, backup data from a server, a user device, a virtual machine, a database and any system, computer or storage are received via a network to be stored. The backups may include a data image, a full system backup data, an incremental backup data, and/or a copy of a portion of data storage. In some embodiments, the common characteristic includes one or more of the following: an operating system type, an operating system provider, an operating system version, a user association, a user category, a device type, a user group, a data size, a storage type, an application, an application type, a network group, a geographical location, a virtualization characteristic, and any other characteristic associated with data, a device, a network and/or storage. For example, within a repository of received backups, backups of backup sources that are utilizing the same operating system type and version are located.

At 204, the backups that share the common characteristic are divided into data chunks. In some embodiments, dividing a backup into data chunks includes dividing data stored in the backup into data portions. For example, data included in a backup is divided (e.g., division is reproducible because data is divided along identified marker within data) into consistently comparable chunks. In some embodiments, the chunking may be also performed as a consequence of performing deduplication to locate data chunks that are duplicated in the backup. In some embodiments, each backup has been already divided into data chunks when the backup data is received. For example, client 106 of FIG. 1 provides to backup server 102 data that has been already divided, sorted, and indexed.

At 206, the data chunks are sorted. In some embodiments, sorting the data chunks includes identifying the number of times a particular same chunk has been utilized. For example, a backup includes data portions that are repeated within the backup and a number of times each data chunk has been utilized in a single backup of the backups that share the common characteristic is determined. In another example, a number of times each same data chunk has been utilized across the backups that share the common characteristic is determined. In some embodiments, sorting the data chunks includes determining an identifier of the data chunks. For example, a hash of each of the data chunks is determined to allow comparison and indexing of the data chunks.

At 208, a portion of the data chunks are selected based at least in part on the sorting and the selected chunks are indexed. In some embodiments, selecting the data chunks includes selecting data chunks that will be included in a base backup reference chunk set for backups that share the common characteristic. For example, the base backup reference chunk set is known to both a sender and a receiver of backup data and for a data chunk that is in the base backup reference chunk set, an identifier of the data chunk can be sent without contents of the data chunk. The selected data chunks may be stored at a central backup server and its backup sources (e.g., clients) to enable efficient backup and restore. In some embodiments, selecting the data chunks includes selecting data chunks that are frequently accessed. For example, a result of the sorting in 206 indicates the number of times a data chunk has been included in one or more backups with the same common characteristic and data chunks with the highest utilization numbers are selected.

In some embodiments, selecting the data chunks includes selecting a certain percentage (e.g., percentage predetermined or dynamically determined) of data chunks that have been most frequently utilized in the backups that share the common characteristic. In some embodiments, selecting the data chunks includes selecting the most number of data chunks that is less than a maximum total data size (e.g., size predetermined or dynamically determined) and have been most frequently utilized in the backups that share the common characteristic. In some embodiments, selecting the data chunks includes selecting smaller total data size of (1) a certain percentage of data chunks that have been most frequently utilized in the backups that share the common characteristic or (2) the most number of data chunks that is less than a maximum total data size and have been most frequently utilized in the backups that share the common characteristic. In some embodiments, selecting the data chunks includes selecting for each backup in the backups that share the common characteristic a group of data chunks that have been frequently accessed and selecting data chunks that are common across all the groups of data chunks of the backups.

In some embodiments, indexing the selected data chunks includes determining an identifier for each of the selected data chunks. For example, a hash function is used to hash each selected data chunk. In some embodiments, indexing the selected data chunks includes storing the selected data chunks in a hash table.

At 210, a copy of the selected data chunks is stored at storage of a backup server. For example, the copy of the selected data chunk is stored at storage of backup server 102 of FIG. 1. In some embodiments, the storage may be included in the backup server and/or the storage may accessible by the backup server via a network. In some embodiments, the index of the selected data chunks is also stored with the copy of the selected data chunks. For example, a hash table that stores the selected data chunks is stored. In some embodiments, by storing the copy of the selected data chunks, the backup server is able to reference data chunks in the selected data chunks without needing to send or receive the actual contents of the data chunks. For example, when a backup is to be performed and stored, the resulting backup data that is received at the backup server may reference a data chunk in the stored selected data chunks by an identifier rather than including the actual contents of the data chunk. In another example, when data is to be restored from using stored backup data, the restored data that is provided may reference a data chunk in the stored selected data chunks by an identifier rather than including the actual contents of the data chunk. In some embodiments, the copy of the selected data chunks may be one of a plurality of groups of reference data chunks. For example, each group of reference data chunks is associated with a different common characteristic.

At 212, a copy of the selected data chunks is stored at storage of one or more backup sources. For example, the copy of the selected data chunk is stored at storage of client 106 of FIG. 1. In some embodiments, the storage may be included in the backup source and/or the storage may accessible by the backup source via a network. In some embodiments, the index of the selected data chunks is also stored with the copy of the selected data chunks. For example, a hash table that stores the selected data chunks is stored. In some embodiments, storing the copy of the selected data chunks includes providing the copy of the selected data chunks to one or more backup sources that share the common characteristic. For example, a backup server provides the copy of the selected data chunks to its backup sources that share the common characteristic.

At 214, a copy of the selected data chunks is included in data that is to be utilized to initialize a new client that shares the common characteristic. For example, the copy of the selected data chunk is included in storage of client 106 of FIG. 1 when client 106 is initialized as a new client. The copy of the selected data chunks may be included in installation binaries of the client. In some embodiments, the index of the selected data chunks is also stored with the copy of the selected data chunks. By including the selected data chunks, a newly initialized client may be able to take advantage of the selected data chunks to efficiently perform backups and restores in communication with a backup server from the outset. In some embodiments, a new virtual machine client is initialized with the copy of the selected data chunks. In various embodiments, the installation binaries may be provided by a backup server and/or an edge server (e.g., remote backup application/server 102 and/or edge server 104 of FIG. 1).

At least a portion of the process of FIG. 2 may be repeated periodically, dynamically, and/or at a configurable interval. For example, the process of FIG. 2 is repeated for each group of backups that share a different common characteristic. In another example, the process of FIG. 2 is repeated for contents of backups that common characteristic changes, evolves, and/or is removed and/or added.

Figure 3:
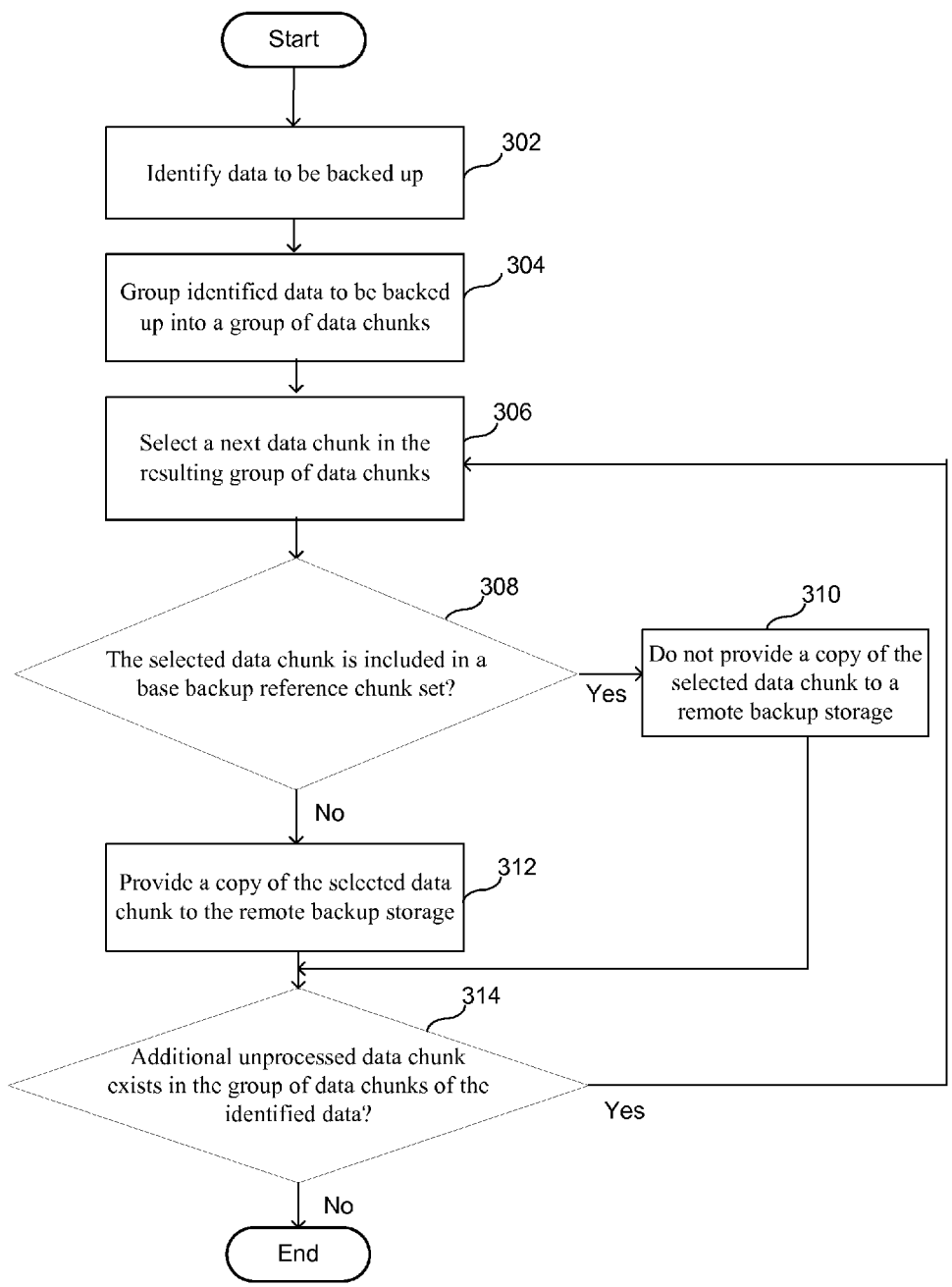
FIG. 3 is a flowchart illustrating an embodiment of a process for performing a backup.

FIG. 3 is a flowchart illustrating an embodiment of a process for performing a backup. The process of FIG. 2 may be implemented on client 106 and/or client 108 of FIG. 1.

At 302, data to be backed up is identified. For example, backup is performed periodically, dynamically, and/or at a predetermined interval (e.g., pursuant to a backup policy) and backup data that is to be provided to a remote backup server for backup is identified. In some embodiments, determining data to be backed up includes identifying data that has been modified since a previous backup.

At 304, the identified data to be backed up is divided into a group of data chunks. In some embodiments, dividing the identified data into data chunks includes dividing the identified data into data portions. For example, data included in the identified data is reliably/reproducibly divided (e.g., division reproducible because data is divided along identified marker within data) into consistently comparable chunks. In some embodiments, the chunking may be also performed as a consequence of performing deduplication.

At 306, a next data chunk is selected in the resulting group of data chunks. For example, each data chunk is individually processed and each data chunk from the group of data chunks is selected for processing.

At 308, it is determined whether the selected data chunk is included in a base backup reference chunk set. In some embodiments, the base backup reference chunk set has been received as a result of 212 and/or 214 of FIG. 2. In some embodiments, determining whether the selected data chunk is included in the base backup reference chunk set includes hashing the selected data chunk using a hash function and determining whether the result of the hash function matches an identifier of the data chunk included in the base backup reference chunk set. For example, it is determined whether the selected data chunk is included in a hash table of the base backup reference chunk set.

If at 308 it is determined that the selected data chunk is included in the base backup reference chunk set, at 310 a copy of the selected data chunk is not provided to a remote backup storage. For example, an identifier (e.g., hash value) of the selected data chunk is provided via a network instead of the content of the selected data chunk to identify the data chunk to be backed up. In some embodiments, the recipient of the identifier of the selected data chunk may obtain contents of the selected data chunk using the received identifier to locate contents of the selected data chunk in the recipient's copy of the base backup reference chunk set. In some embodiments, the recipient of the identifier of the selected data chunk backs up an identifier of the selected backup rather than contents of the selected backup.

If at 308 it is determined that the selected data chunk is not included in the base backup reference chunk set, at 312 a copy of the selected data chunk is provided to the remote backup storage. For example, a copy of the selected data chunk is provided via a network to be stored at the backup storage.

At 314, it is determined whether any additional unprocessed data chunk exists in the group of data chunks of the identified data. If at 314 it is determined that an additional unprocessed data chunk exists, the process returns to 306 where the next data chunk to be processed is selected. If at 314 it is determined that an additional unprocessed data chunk does not exist, a backup is completed and the process ends.

Figure 4:
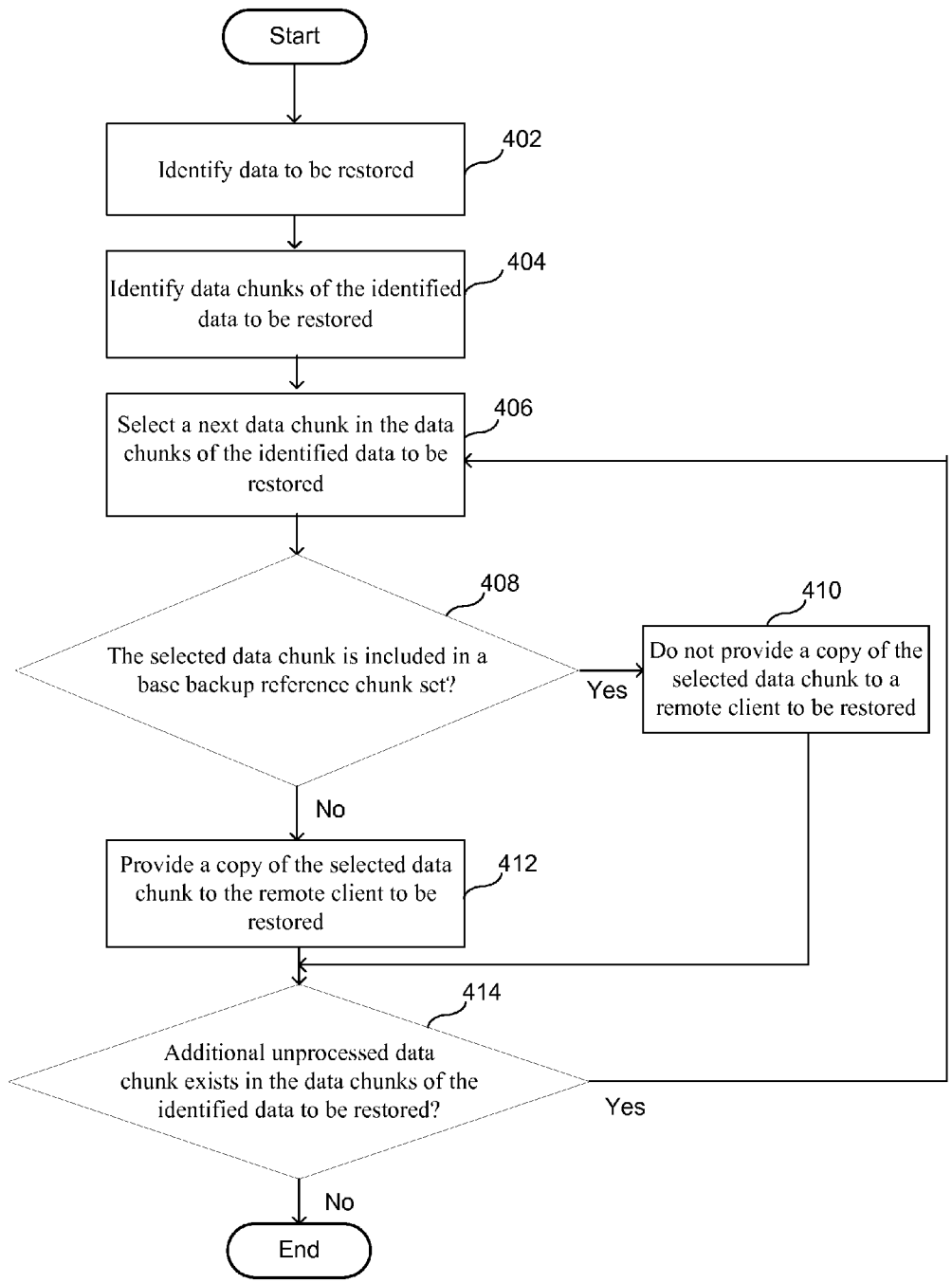
FIG. 4 is a flowchart illustrating an embodiment of a process for performing a data restore.

FIG. 4 is a flowchart illustrating an embodiment of a process for performing a data restore. The process of FIG. 4 may be implemented on backup application/server 102 of FIG. 1.

At 402, data to be restored is identified. For example, a backup source (e.g., client) is to be restored using backed up data (e.g., restored from data backed up using at least a portion of the process of FIG. 3). In some embodiments, identification of the data to be restored is received from a client that desires to restore data. In some embodiments, the data to be restored is associated with a backup source that encountered an error and is to be restored. For example, determining the data to be restored includes identifying data of a backup source that has encountered an error and/or failure. In some embodiments, the data to be restored is associated with a new client that is to be cloned from another source client and the backup data of the source client is to be utilized to restore the new client.

At 404, data chunks of the identified data to be restored are identified. In some embodiments, a list that identifies data chunks included in the identified data to be restored is obtained. For example, a backup data source of the identified data to be restored has been chunked (e.g., using at least a portion of the process of FIG. 3) and stored as chunks with a mapping that that specifies the ordering of the chunks that make up a complete backup data instance.

At 406, a next data chunk is selected in the data chunks of the identified data to be restored. For example, each data chunk is individually processed and each data chunk is selected for processing.

At 408, it is determined whether the selected data chunk is included in a base backup reference chunk set. In some embodiments, the base backup reference chunk set has been received as a result of 210 of FIG. 2. In some embodiments, determining whether the selected data chunk is included in the base backup reference chunk set includes hashing the selected data chunk using a hash function and determining whether the result of the hash function matches an identifier of data chunk included in the base backup reference chunk set. For example, it is determined whether the selected data chunk is included in a hash table of the base backup reference chunk set. In some embodiments, each base backup reference chunk set in a plurality of sets is specific to a particular group of one or more clients that share a particular common characteristic and which base backup reference chunk set to utilize is determined based on the common characteristic particular to the remote client to be restored. For example, an identifier of the common characteristic and/or which base backup reference chunk set to utilize may be received along with a data restore request. In another example, a data structure that maps base backup reference chunk sets to different clients and/or common characteristics is utilized.

If at 408 it is determined that the selected data chunk is included in the base backup reference chunk set, at 410 a copy of the selected data chunk is not provided to a remote client to be restored. For example, an identifier (e.g., hash value) of the selected data chunk is provided via a network instead of the content of the selected data chunk to identify the data chunk to be utilized to restore data. In some embodiments, the recipient of the identifier of the selected data chunk may obtain contents of the selected data chunk using the received identifier and the recipient's copy of the base backup reference chunk set to utilize in the data restore.

If at 408 it is determined that the selected data chunk is not included in the base backup reference chunk set, at 412 a copy of the selected data chunk is provided to the remote client to be restored. For example, a copy of the selected data chunk is provided via a network to be utilized to restore data.

At 414, it is determined whether any additional unprocessed data chunk exists in the data chunks of the identified data to be restored. If at 414 it is determined that an additional unprocessed data chunk exists, the process returns to 406 where the next data chunk to be processed is selected. If at 414 it is determined that an additional unprocessed data chunk does not exist, the data to be utilized to restore the identified data has been all identified and/or provided and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
profile contents of a plurality of backups associated with a group of backup sources that share a common characteristic;
select a portion of the plurality of backups as a base backup reference data to be distributed, wherein the selected portion appears a number of times across the plurality of backups associated with the group of backup sources that share the common characteristic;
store a first copy of the base backup reference data at a storage of a backup server, wherein the backup server provides an identifier of a portion of data to be utilized to restore data rather than contents of the portion of data to be utilized to restore data due to a determination that the portion of data to be utilized to restore data is included in the base backup reference data associated with the common characteristic; and
provide a second copy of the base backup reference data for storage at a storage of a client that shares the common characteristic, wherein the client is located remotely from the backup server; and
a memory coupled to the processor and configured to provide the processor with instructions.

2. The system of claim 1, wherein profiling the contents of the plurality of backups includes dividing at least one backup of the plurality of backups into a plurality of data chunks.

3. The system of claim 2, wherein profiling the contents includes sorting the plurality of data chunks.

4. The system of claim 2, wherein profiling the contents includes determining a number of times a particular data chunk has been utilized in the plurality of backups.

5. The system of claim 2, wherein profiling the contents includes determining a number of times a particular data chunk has been utilized in a single backup of the plurality of backups.

6. The system of claim 2, wherein selecting the portion of the plurality of backups as the base backup reference data includes selecting a specified percentage of the data chunks that have been most frequently utilized in the plurality of backups.

7. The system of claim 2, wherein selecting the portion of the plurality of backups as the base backup reference data includes selecting a most number of data chunks that is less than a maximum total data size and have been most frequently utilized in the plurality of backups.

8. The system of claim 2, wherein selecting the portion of the plurality of backups as the base backup reference data includes indexing the data chunks using a hash function.

9. The system of claim 1, wherein the base backup reference data is stored in a hash table.

10. The system of claim 1, wherein the client provides an identifier of a portion of data to be backed up rather than contents of the portion of the data to be backed up due to a determination that the portion of the data to be backed up is included in the base backup reference data.

11. The system of claim 1, wherein profiling the contents of the plurality of backups includes performing deduplication of the plurality of backups.

12. The system of claim 1, wherein the client provides to the backup server content to be backed up.

13. The system of claim 1, wherein the common characteristic includes a common operating system type.

14. The system of claim 1, wherein the common characteristic includes a common application installed on devices of the plurality of backups.

15. The system of claim 1, wherein the backup server provides data utilized to restore data of the client.

16. The system of claim 1, wherein the client is a virtual machine.

17. The system of claim 1, wherein the storage of the backup server is a networked data storage accessible by the backup server via a network.

18. A method, comprising:
using a processor to profile contents of a plurality of backups associated with a group of backup sources that share a common characteristic;
selecting a portion of the plurality of backups as a base backup reference data to be distributed, wherein the selected portion appears a number of times across the plurality of backups associated with the group of backup sources that share the common characteristic;
storing a first copy of the base backup reference data at a storage of a backup server, wherein the backup server provides an identifier of a portion of data to be utilized to restore data rather than contents of the portion of data to be utilized to restore data due to a determination that the portion of data to be utilized to restore data is included in the base backup reference data associated with the common characteristic; and
providing a second copy of the base backup reference data for storage at a storage of a client that shares the common characteristic, wherein the client is located remotely from the backup server.

19. A computer program product, the computer program product being embodied in a tangible non-transitory computer readable storage medium and comprising computer instructions for:
profiling contents of a plurality of backups associated with a group of backup sources that share a common characteristic;
selecting a portion of the plurality of backups as a base backup reference data to be distributed, wherein the selected portion appears a number of times across the plurality of backups associated with the group of backup sources that share the common characteristic;
storing a first copy of the base backup reference data at a storage of a backup server, wherein the backup server provides an identifier of a portion of data to be utilized to restore data rather than contents of the portion of data to be utilized to restore data due to a determination that the portion of data to be utilized to restore data is included in the base backup reference data associated with the common characteristic; and
providing a second copy of the base backup reference data for storage at a storage of a client that shares the common characteristic, wherein the client is located remotely from the backup server.

* * * * *